United States Patent
Okun et al.

(10) Patent No.: US 9,197,277 B2
(45) Date of Patent: Nov. 24, 2015

(54) TWO-WAY WIRELESS COMMUNICATION ENABLED INTRUSION DETECTOR ASSEMBLIES

(71) Applicant: Tyco Fire & Security Gmbh, Neuhausen am Rheinfall (CH)

(72) Inventors: Efim Okun, Petah Tiqwa (IL); Yizhaq Pinhas, Shoham (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 100 days.

(21) Appl. No.: 14/169,166

(22) Filed: Jan. 31, 2014

(65) Prior Publication Data
US 2015/0200700 A1 Jul. 16, 2015

Related U.S. Application Data

(63) Continuation-in-part of application No. 14/153,135, filed on Jan. 13, 2014.

(51) Int. Cl.
*G08B 13/08* (2006.01)
*H04B 1/40* (2015.01)
*H01Q 13/16* (2006.01)
*H01Q 9/04* (2006.01)
*G08B 13/22* (2006.01)

(52) U.S. Cl.
CPC ........ *H04B 1/40* (2013.01); *G08B 13/08* (2013.01); *G08B 13/22* (2013.01); *H01Q 9/0407* (2013.01); *H01Q 13/16* (2013.01)

(58) Field of Classification Search
CPC .......... G08B 13/08; H01Q 1/38; H01Q 1/40; H01Q 13/16; H01Q 9/0407
USPC ............ 340/547, 541, 542; 235/492; 716/137
See application file for complete search history.

(56) References Cited

U.S. PATENT DOCUMENTS

| 5,164,705 | A | 11/1992 | Dunagan et al. |
| 5,392,025 | A | 2/1995 | Figh et al. |
| 6,400,267 | B1 | 6/2002 | Gordon-Levitt et al. |
| 6,583,769 | B2 * | 6/2003 | Shiroki et al. ................ 343/702 |
| 6,737,969 | B2 | 5/2004 | Carlson |
| 7,081,816 | B2 | 7/2006 | Schebel |
| 7,102,220 | B2 * | 9/2006 | Stevens et al. ................ 257/686 |

(Continued)

OTHER PUBLICATIONS

MC-302V Supervised PowerG Vanishing Magnetic Contact Device, Visonic Ltd. (2013).

(Continued)

*Primary Examiner* — John A Tweel, Jr.
(74) *Attorney, Agent, or Firm* — HoustonHogle, LLP

(57) ABSTRACT

A fixed magnetic contact wireless transceiver including a two-way transceiver element adapted to be operable for two-way wireless communication between a fixed magnetic contact wireless transceiver component and an intrusion alarm system, an antenna facilitating the two-way wireless communication between the fixed magnetic contact wireless transceiver component and the intrusion alarm system, and an antenna ground reference plane, opposite the antenna, wherein the antenna includes a substrate, a top surface of the substrate being coated with a gold plated copper substrate coating, the coating having a gap formed therein, and half via holes formed in a perimeter of the antenna, the half via holes being coated with gold plated copper half via hole coatings which form a continuum with the gold plated copper substrate coating.

28 Claims, 6 Drawing Sheets

(56) References Cited

U.S. PATENT DOCUMENTS

| | | | |
|---|---|---|---|
| 7,342,540 | B2 | 3/2008 | Nahar |
| 7,352,326 | B2 | 4/2008 | Korva |
| 7,692,595 | B2 | 4/2010 | Kim |
| 7,805,689 | B2 * | 9/2010 | Ueda et al. .................. 716/137 |
| 7,967,216 | B2 * | 6/2011 | Kato et al. .................. 235/492 |
| 8,193,988 | B2 | 6/2012 | Thudor |
| 8,624,736 | B2 | 1/2014 | Gore et al. |
| 2005/0237255 | A1 | 10/2005 | Zhang |
| 2011/0057851 | A1 | 3/2011 | Chung |
| 2013/0200162 | A1 * | 8/2013 | Dokai et al. .................. 235/492 |
| 2013/0257611 | A1 | 10/2013 | Lamb et al. |
| 2015/0048944 | A1 | 2/2015 | Chen |

OTHER PUBLICATIONS

Sensors & Accessories ,Wireless Vanishing Door/Window contact EV-DW4975 (Jan. 2008).

Honeywell's 5811 Thin Door/Window Contact Transmitter (May 2009).

Federal Communications Commission , Part 15—Radio Frequency Devices ,47 CFR Ch. I, pp. 751-870 (Oct. 1, 2009 Edition).

European Standard ,ETSI EN 300 220-1 V2.4.1, Electromagnetic compatibility and Radio spectrum Matters (ERM); Short Range Devices (SRD); Radio equipment to be used in the 25 MHz to 1 000 MHz frequency range with power levels ranging up to 500 mW; Part 1: Technical characteristics and test methods (May 2012).

Harmonized European Standard, ETSI EN 300 220-2 V2.4.1, Electromagnetic compatibility and Radio spectrum Matters (ERM); Short Range Devices (SRD); Radio equipment to be used in the 25 MHz to 1 000 MHz frequency range with power levels ranging up to 500 mW; Part 2: Harmonized EN covering essential requirements under article 3.2 of the R&TTE Directive (May 2012).

Neo Brochure: "PowerSeries NEO, With PowerSeries Neo products, no measures are spared to achieve stellar industry standards". (2013).

PowerG Booklet: "Taking Wireless Security", by Visonic (2013).

EV-DW4975 Vanishing Door/Window Contact Installation Manual (2006).

* cited by examiner

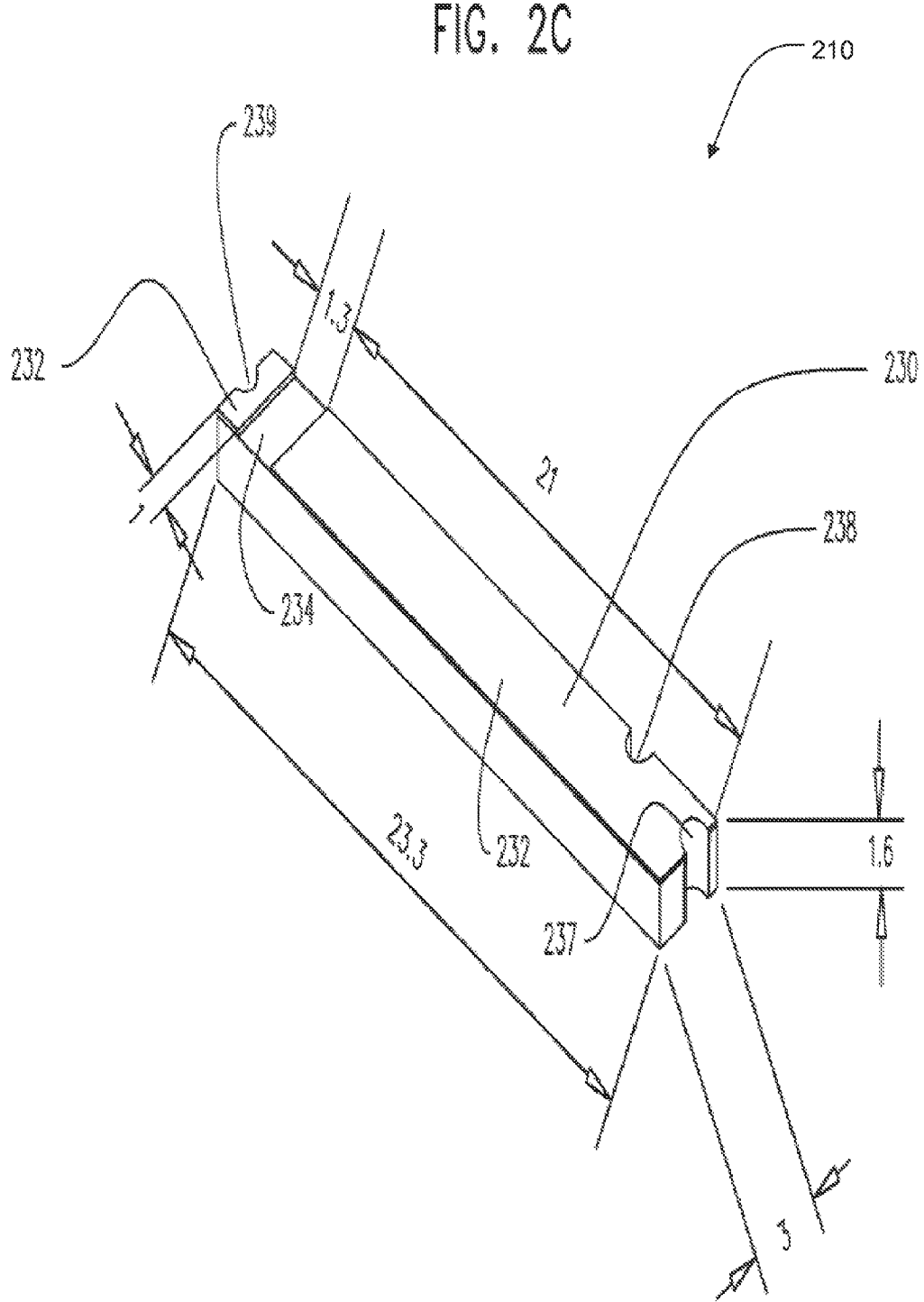

TWO-WAY WIRELESS COMMUNICATION ENABLED INTRUSION DETECTOR ASSEMBLIES

REFERENCE TO RELATED APPLICATION

This application is a Continuation-in-Part of U.S. application Ser. No. 14/153,135 filed on Jan. 13, 2014, the entire contents of which are incorporated by reference herein.

FIELD OF THE INVENTION

The present invention relates to two-way wireless communication enabled intrusion detectors and intrusion detector assemblies.

BACKGROUND OF THE INVENTION

Intrusion detectors typically employed in door or window intrusion detector assemblies are typically prone to be visible to potential intruders. It is therefore advantageous to provide intrusion detectors which are small and easy to conceal.

Additionally, it is advantageous to provide intrusion detectors which communicate with a central alarm system via wireless communication, thereby eliminating the need for installation of communication wiring.

It is further advantageous to provide intrusion detectors which communicate wirelessly via a two-way communication system, thereby facilitating more reliable communication that is less prone to interference or blocking.

The present invention therefore seeks to provide an intrusion detector assembly having a narrow physical profile, while providing intrusion detection capabilities and two-way wireless communication functionality for communicating with an alarm system.

SUMMARY OF THE INVENTION

The present invention seeks to provide improved two-way wireless communication enabled intrusion detectors and intrusion detector assemblies.

There is thus provided in accordance with a preferred embodiment of the present invention a fixed magnetic contact wireless transceiver including a two-way transceiver element adapted to be operable for two-way wireless communication between a fixed magnetic contact wireless transceiver component and an intrusion alarm system, an antenna facilitating the two-way wireless communication between the fixed magnetic contact wireless transceiver component and the intrusion alarm system, and an antenna ground reference plane, opposite the antenna, wherein the antenna includes a substrate, a top surface of the substrate being coated with a gold plated copper substrate coating, the coating having a gap formed therein, and half via holes formed in a perimeter of the antenna, the half via holes being coated with gold plated copper half via hole coatings which form a continuum with the gold plated copper substrate coating of the substrate.

Additionally, the antenna ground reference plane includes a flat elongate portion, first and second downward folded end portions extending downwardly from corresponding first and second ends of the flat elongate portion, and an elongate folded side portion extending from a side edge of the flat elongate portion.

Preferably, the antenna has a volume of less than 112 cubic millimeters. More preferably, the antenna has a volume of 111.84 cubic millimeters. Preferably, the antenna has a length of less than 24 millimeters, a width of less than 4 millimeters, and a thickness less than 2 millimeters. More preferably, the antenna has a length of 23.3 millimeters, a width of 3 millimeters, and a thickness of 1.6 millimeters.

Preferably, the flat elongate portion has a volume of less than 16 cubic millimeters. More preferably, the flat elongate portion has a volume of 15.972 cubic millimeters. Preferably, the flat elongate portion has a length of less than 25 millimeters, a width of less than 4 millimeters and a thickness less than 0.5 millimeters, each of the first and second downward folded end portions has a width of less than 4 millimeters and a thickness of less than 0.5 millimeters, and extends downwardly less than 1.5 millimeters from the corresponding first and second ends of the flat elongate portion, and the elongate folded side portion extends outwardly less than 1 millimeter and downwardly less than 1.5 millimeters from the side edge of the flat elongate portion. More preferably, the flat elongate portion has a length of 24.2 millimeters, a width of 3.3 millimeters and a thickness of 0.2 millimeters, each of the first and second downward folded end portions has a width of 3.3 millimeters and a thickness of 0.2 millimeters, and extends downwardly 1.1 millimeters from the corresponding first and second ends of the flat elongate portion, and the elongate folded side portion extends outwardly 0.5 millimeters and downwardly 1.1 millimeters from the side edge of the flat elongate portion.

Preferably, the fixed magnetic contact wireless transceiver also includes a REED switch operable for sensing changes in a magnetic field induced by the magnet component, the changes being potentially indicative of an intrusion and for communicating indications of the changes to the alarm system via the two-way transceiver component.

Preferably, the magnet component includes a contact component installation marker for alignment thereof with a corresponding transceiver component installation marker included on the fixed magnetic contact wireless transceiver component, upon installation of the magnet component and the fixed magnetic contact wireless transceiver component.

Preferably, the fixed magnetic contact wireless transceiver component also includes a bottom housing element and two interconnecting top housing elements. Preferably, at least one of the interconnecting top housing elements includes at least one snap-in element integrally formed therein, configured for snap-in engagement with at least one recess formed in the bottom housing element, thereby fastening the at least one of the interconnecting top housing elements to the bottom housing element and retaining the two-way transceiver element within the top and bottom housing elements.

Preferably, a first one of the interconnecting top housing elements is configured for slidable fastening thereof onto the bottom housing element and for interconnecting with a second one of the interconnecting top housing elements via interconnecting latch elements integrally formed on each of the interconnecting top housing elements.

Preferably, the bottom housing element includes a battery housing element for housing a battery, and at least one snap-in element operable for retaining the battery within the battery housing. Preferably, the battery housing element includes at least one battery engaging element and at least one battery circuit engaging element, and the two-way transceiver element includes at least one transceiver circuit engaging element, the battery engaging element being operable for galvanically connecting a negative contact of the battery with the at least one battery circuit engaging element, the at least one battery circuit engaging element being operable for galvanic engagement with the at least one transceiver circuit engaging element of the two-way transceiver element upon enclosing the two-way transceiver element within the housing elements.

Preferably, the fixed magnetic contact wireless transceiver component also includes a tamper switch, wherein an attempt to tamper with the fixed magnetic contact wireless transceiver component results in toggling of the tamper switch.

Preferably, the two-way transceiver element includes a battery engaging element operable for engaging a positive contact of the battery.

Preferably, the antenna is configured for high frequency communication with the alarm system, the high frequency being between 2405 and 2480 MHz.

Preferably, the antenna ground reference plane opposite the antenna is operative to improve the gain of the antenna and to diminish interfering effects of materials disposed in a vicinity of the fixed magnetic contact wireless transceiver component. Preferably, the materials include metals, and the interfering effects include at least one of mistuning of the antenna, degradation of performance of the antenna and degradation of a range of the antenna.

Preferably, the substrate of the antenna is formed of PCB. Preferably, the antenna ground reference plane is formed of stainless steel.

Preferably, the gap is located less than 2 millimeters from a first end of the antenna, and has a width which is less than 2 millimeters. More preferably, the gap is located 1 millimeter from a first end of the antenna, and has a width of 1.3 millimeters.

Preferably, the half via holes include a first half via hole formed in a second end of the antenna, opposite the first end of the antenna, the first half via hole being grounded, a second half via hole formed in the first end of the antenna, the second half via hole being operable as an input\output port of the antenna, and a third half via hole formed in a side of the antenna, the third half via hole being connected to ground. Preferably, a stray capacitance provided by the gap facilitates tuning of a frequency of the antenna.

BRIEF DESCRIPTION OF THE DRAWINGS

The present invention will be understood and appreciated more fully from the following detailed description taken in conjunction with the drawings in which:

FIG. 2C is a simplified pictorial illustration of an antenna which is part of the two-way transceiver element of FIGS. 2A & 2B.

DETAILED DESCRIPTION OF PREFERRED EMBODIMENTS

Figure 1A:
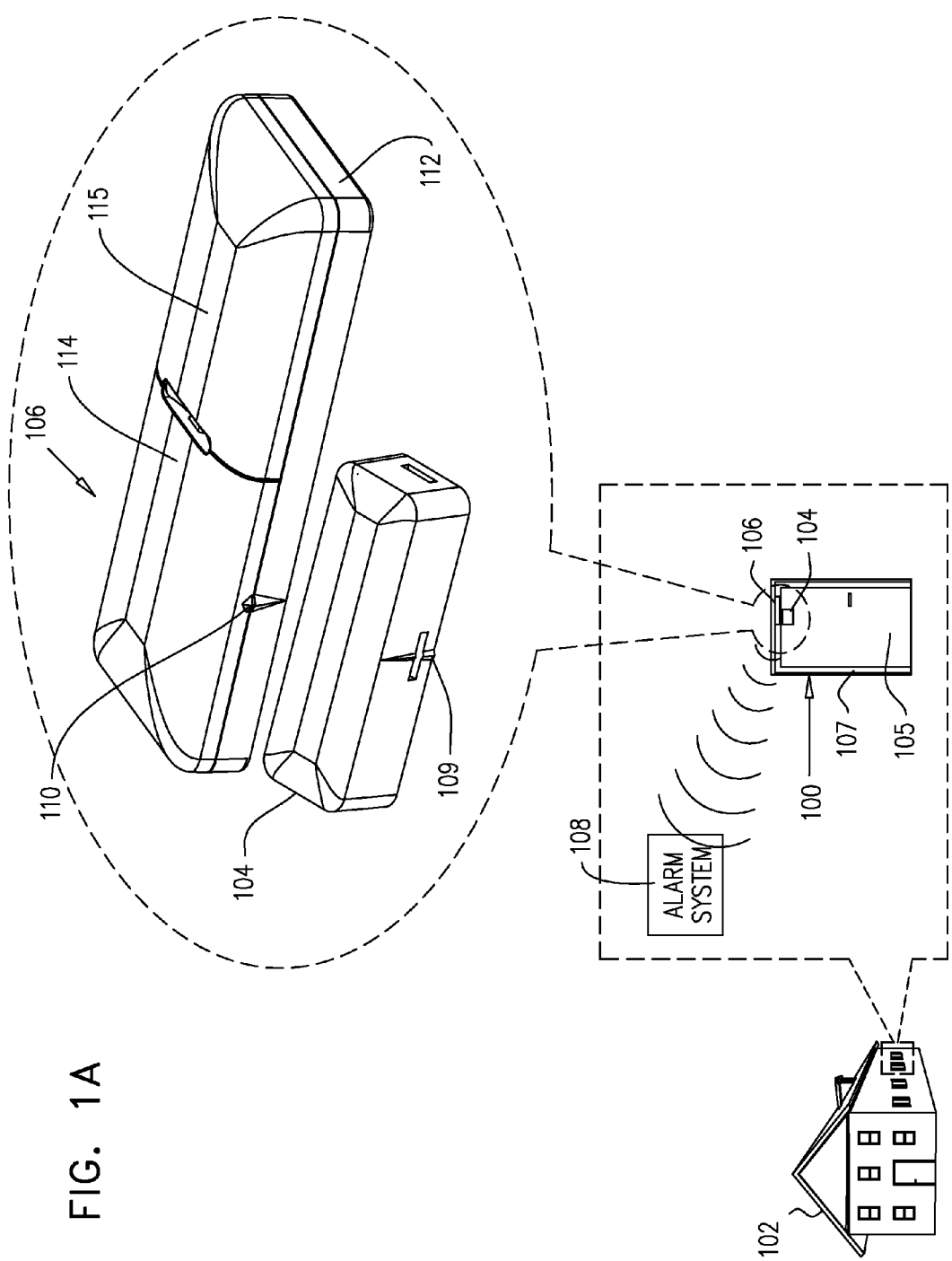
FIG. 1A is a simplified pictorial illustration of a wireless door\window magnetic contact transceiver for use in a door intrusion detection assembly, constructed and operative in accordance with a preferred embodiment of the present invention.
Figure 1B:
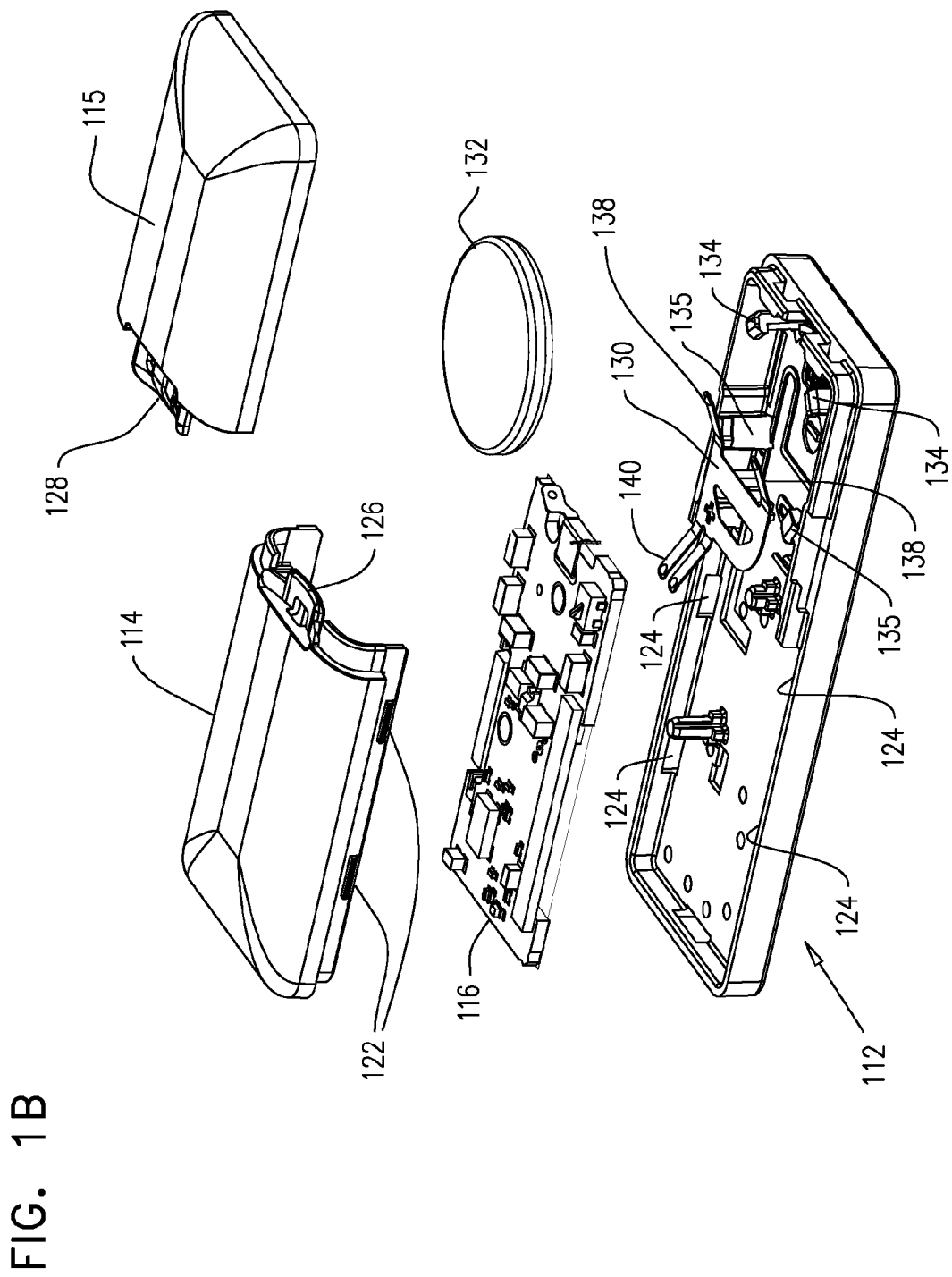
FIG. 1B is a simplified exploded view illustration of the wireless door\window magnetic contact transceiver of FIG. 1A.

Reference is now made to FIG. 1A, which is a simplified pictorial illustration of a wireless door\window magnetic contact transceiver for use in a door\window intrusion detection assembly, constructed and operative in accordance with a preferred embodiment of the present invention, and to FIG. 1B, which is a simplified exploded view illustration of the wireless door\window magnetic contact transceiver of FIG. 1A.

As shown in FIG. 1A, a door intrusion detection assembly 100 of a residence 102 preferably includes a magnet component 104 installed on a door 105 and a fixed magnetic contact wireless transceiver component 106 installed on a corresponding door frame 107. Fixed magnetic contact wireless transceiver component 106 is preferably operable for wirelessly communicating with an alarm system 108 protecting home 102.

It is appreciated that magnet component 104 and fixed magnetic contact wireless transceiver component 106 are of a narrow physical profile, thereby facilitating concealment of magnet component 104 and fixed magnetic contact wireless transceiver component 106 from potential intruders.

A contact component installation marker 109 is preferably provided on magnet component 104 for alignment with a corresponding transceiver component installation marker 110 provided on wireless transceiver component 106 upon installation of magnet component 104 and wireless transceiver component 106 in door assembly 100.

Fixed magnetic contact wireless transceiver component 106 preferably includes bottom housing element 112 and two interconnecting top housing elements 114 and 115.

Turning now to FIG. 1B, it is shown that fixed magnetic contact wireless transceiver component 106 also includes a two-way transceiver element 116. It is appreciated that two-way transceiver element 116 preferably operates in compliance with the ZigBee communication standard.

Snap-in elements 122 are preferably integrally formed in interconnecting top housing element 114 for snap-in engagement with recesses 124 formed in bottom housing element 112, thereby fastening interconnecting top housing element 114 to bottom housing element 112 and retaining two-way transceiver element 116 within housing elements 112 and 114. Interconnecting top housing element 115 is preferably configured for slidable fastening thereof onto bottom housing element 112 and for interconnecting with interconnecting top housing element 114 via interconnecting latch elements 126 and 128 formed on interconnecting top housing elements 114 and 115, respectively.

Bottom housing element 112 preferably includes a battery housing element 130 for housing a battery 132, which is preferably retained within battery housing 130 by a pair of snap-in elements 134 and a pair of retaining elements 135.

Battery engaging elements 138 are preferably formed in battery housing element 130 for galvanically connecting a negative contact of battery 132 with battery circuit engaging elements 140. Circuit engaging elements 140 are preferably configured for galvanic engagement with transceiver circuit engaging elements of two-way transceiver element 116 upon enclosing two-way transceiver element 116 within housing elements 112, 114 and 115.

Figure 2A:
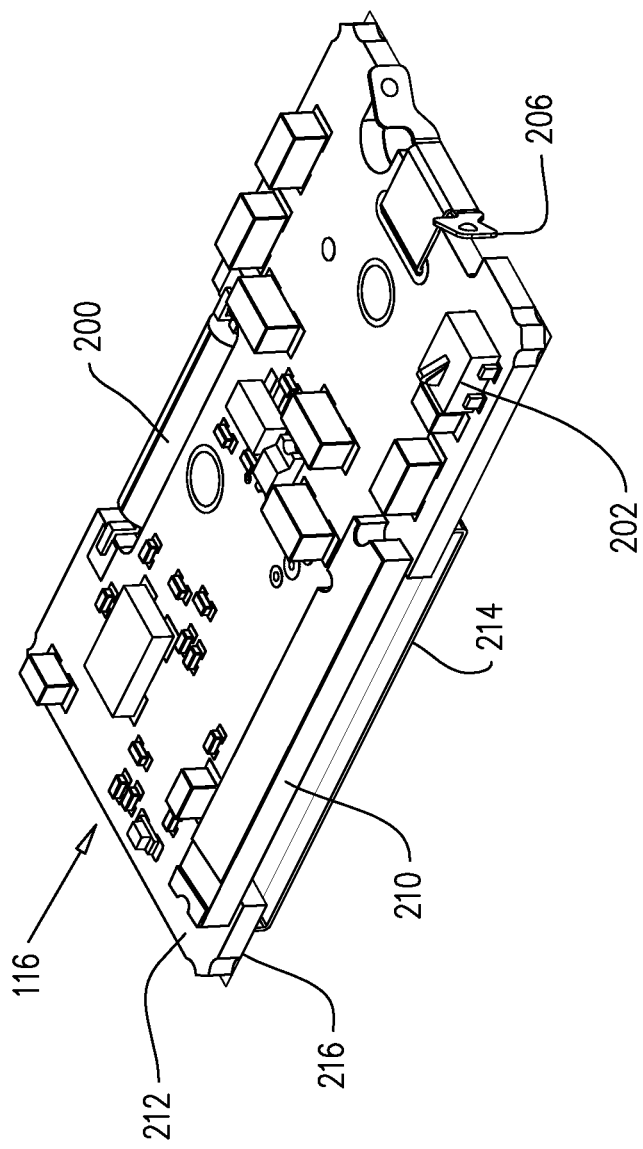
FIGS. 2A & 2B are respective top and bottom view illustrations of a two-way transceiver element of the wireless door\window magnetic contact transceiver of FIGS. 1A & 1B, constructed and operative in accordance with the preferred embodiment of the present invention.
Figure 2B:
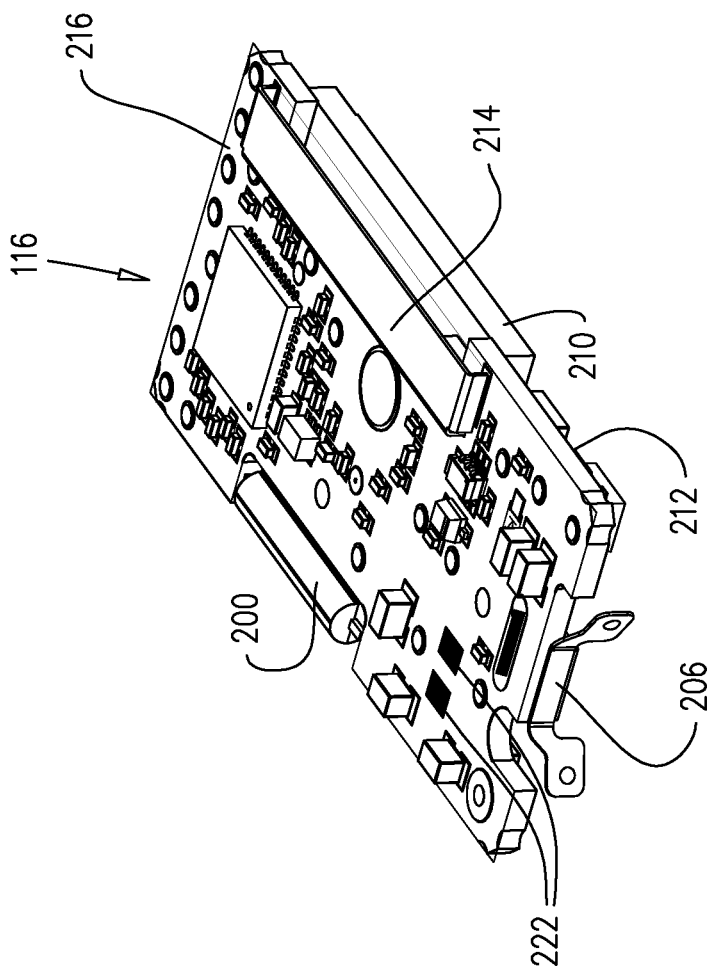

Reference is now made to FIGS. 2A & 2B, which are respective top and bottom view illustrations of two-way transceiver element 116 of the wireless door 1 window magnetic contact transceiver of FIGS. 1A & 1B, constructed and operative in accordance with the preferred embodiment of the present invention.

As shown in FIGS. 2A & 2B, a REED switch 200 is provided for sensing changes in a magnetic field induced by magnet component 104 of door intrusion detection assembly 100 (FIG. 1A) installed in close proximity thereto. It is appreciated that opening of door 105 upon which magnet component 104 is installed relative to door frame 107 upon which wireless transceiver component 106 is installed, is operative to create changes in the magnetic field sensed by REED switch 200, and to thereby indicate opening of door 105.

A tamper switch 202 is preferably provided on two-way transceiver element 116 for detecting disengaging of interconnecting top housing element 115 of fixed magnetic contact wireless transceiver component 106 from bottom housing element 112 and thereby indicating possible tampering with wireless transceiver component 106.

A battery engaging element 206 is provided for engaging a positive contact of battery 132 housed in housing element 130 of top housing element 112 (FIG. 1B).

An antenna 210 is provided on a top surface 212 of two-way transceiver element 116 for two-way communication between wireless transceiver component 106 and alarm system 108, and an antenna ground reference plane 214 is preferably provided on a bottom surface 216 of two-way transceiver element 116, generally opposite antenna 210. Antenna 210 is preferably a high frequency antenna operative for communicating, for example, between 2405 and 2480 MHz. It is appreciated that the configuration of antenna ground reference plane 214 opposite antenna 210 is operative to improve the gain of antenna 210 and to diminish interfering effects of various materials, such as metals, disposed in the vicinity of wireless transceiver component 106. Such interfering effects may, for example, cause mistuning of antenna 210 or degradation of performance and range of antenna 210.

As further shown in FIG. 2B, transceiver circuit engaging elements 222 are preferably provided for engaging battery circuit engaging elements 140 of bottom housing element 112 when two-way transceiver element 116 is in engagement with bottom housing element 112.

Reference is now made to FIG. 2C, which is a simplified pictorial illustration of antenna 210 which is part of two-way transceiver element 116 of FIGS. 2A & 2B. As shown in FIG. 2C, antenna 210 has a length of 23.3 or 24 millimeters and a width of 3 millimeters. Antenna 210 preferably includes a substrate 230 preferably formed of PCB produced with, for example, IT-158BS multifunctional filled epoxy, commercially available from ITEQ Corporation of Taoyuan, Taiwan.

A top surface of substrate 230 is preferably coated with a gold plated copper coating 232. A gap 234 is preferably formed in coating 232, gap 234 being located approximately 1 millimeter from one end of antenna 210 and having a width of approximately 1.3 millimeters. It is appreciated that gold plated copper coating 232 is preferably a 1 ounce gold plated copper coating, having a thickness of approximately 0.0347 millimeters.

Half via holes 237, 238 and 239 are preferably formed in the perimeter of antenna 210, and are preferably coated with gold plated copper coatings which form a continuum with coating 232.

When mounted on two-way transceiver element 116 (FIG. 2A), half via hole 237 is preferably grounded, half via hole 238 preferably serves as an input 1 output port of antenna 210, and half via hole 239 is preferably connected to ground. The stray capacitance provided by gap 234 preferably facilitates tuning of the frequency of antenna 210.

Figure 2D:
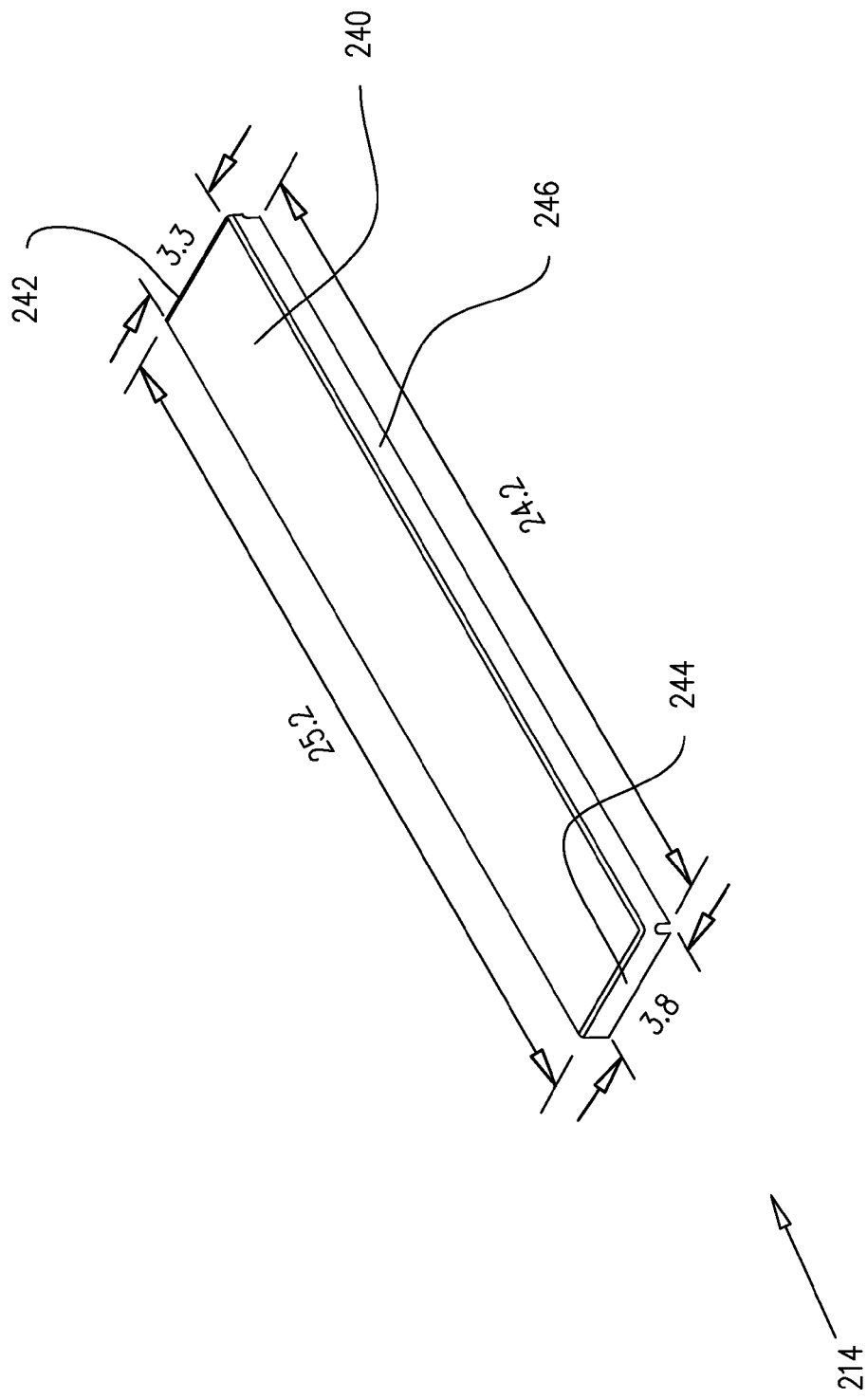
FIG. 2D is a simplified pictorial illustration of an antenna ground reference plane which is part of the two-way transceiver element of FIGS. 2A & 2B.

Reference is now made to FIG. 2D, which is a simplified pictorial illustration of antenna ground reference plane 214 which is part of two-way transceiver element 116 of FIGS. 2A & 2B. As shown in FIG. 2D, antenna ground reference plane 214 includes a flat elongate portion 240 having a length of 24.2 or 25.2 millimeters, a width of 3.3 millimeters and a thickness of 0.2 millimeters. Downward folded end portions 242 and 244, having a thickness of 0.2 millimeters, extend downwardly 1.1 millimeters from corresponding ends of flat elongate portion 240. An elongate folded side portion 246 extends outwardly 0.5 millimeters and downwardly 1.1 millimeters from a side edge of flat elongate portion 240. Antenna ground reference plane 214 is preferably formed of stainless steel.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A fixed magnetic contact wireless transceiver comprising:
    a two-way transceiver element adapted to be operable for two-way wireless communication between a fixed magnetic contact wireless transceiver component and an intrusion alarm system;
    an antenna facilitating said two-way wireless communication between said fixed magnetic contact wireless transceiver component and said intrusion alarm system; and
    an antenna ground reference plane, opposite said antenna, wherein said antenna comprises:
    a substrate, a top surface of said substrate being coated with a gold plated copper substrate coating, said coating having a gap formed therein; and
    half via holes formed in a perimeter of said antenna, said half via holes being coated with gold plated copper half via hole coatings which form a continuum with said gold plated copper substrate coating of said substrate.

2. A fixed magnetic contact wireless transceiver according to claim 1 and wherein said antenna ground reference plane comprises:
    a flat elongate portion;
    first and second downward folded end portions extending downwardly from corresponding first and second ends of said flat elongate portion; and
    an elongate folded side portion extending from a side edge of said flat elongate portion.

3. A fixed magnetic contact wireless transceiver according to claim 1 and wherein said antenna has a volume of less than 112 cubic millimeters.

4. A fixed magnetic contact wireless transceiver according to claim 1 and wherein said antenna has a volume of 111.84 cubic millimeters.

5. A fixed magnetic contact wireless transceiver according to claim 1 and wherein said antenna has a length of less than 24 millimeters, a width of less than 4 millimeters, and a thickness less than 2 millimeters.

6. A fixed magnetic contact wireless transceiver according to claim 1 and wherein said antenna has a length of 23.3 millimeters, a width of 3 millimeters, and a thickness of 1.6 millimeters.

7. A fixed magnetic contact wireless transceiver according to claim 2 and wherein said flat elongate portion has a volume of less than 16 cubic millimeters.

8. A fixed magnetic contact wireless transceiver according to claim 2 and wherein said flat elongate portion has a volume of 15.972 cubic millimeters.

9. A fixed magnetic contact wireless transceiver according to claim 2 and wherein:

said flat elongate portion has a length of less than 25 millimeters, a width of less than 4 millimeters and a thickness less than 0.5 millimeters;

each of said first and second downward folded end portions has a width of less than 4 millimeters and a thickness of less than 0.5 millimeters, and extends downwardly less than 1.5 millimeters from said corresponding first and second ends of said flat elongate portion; and said elongate folded side portion extends outwardly less than 1 millimeter and downwardly less than 1.5 millimeters from said side edge of said flat elongate portion.

10. A fixed magnetic contact wireless transceiver according to claim 2 and wherein:

said flat elongate portion has a length of 24.2 millimeters, a width of 3.3 millimeters and a thickness of 0.2 millimeters;

each of said first and second downward folded end portions has a width of 3.3 millimeters and a thickness of 0.2 millimeters, and extends downwardly 1.1 millimeters from said corresponding first and second ends of said flat elongate portion; and said elongate folded side portion extends outwardly 0.5 millimeters and downwardly 1.1 millimeters from said side edge of said flat elongate portion.

11. A fixed magnetic contact wireless transceiver according to claim 1 and also comprising a REED switch operable for:

sensing changes in a magnetic field induced by said magnet component, said changes being potentially indicative of an intrusion; and communicating indications of said changes to said alarm system via said two-way transceiver component.

12. A fixed magnetic contact wireless transceiver according to claim 1 and wherein said magnet component comprises a contact component installation marker for alignment thereof with a corresponding transceiver component installation marker comprised on said fixed magnetic contact wireless transceiver component, upon installation of said magnet component and said fixed magnetic contact wireless transceiver component.

13. A fixed magnetic contact wireless transceiver according to claim 1 and wherein said fixed magnetic contact wireless transceiver component also comprises a bottom housing element and two interconnecting top housing elements.

14. A fixed magnetic contact wireless transceiver according to claim 11 and wherein at least one of said interconnecting top housing elements comprises at least one snap-in element integrally formed therein, configured for snap-in engagement with at least one recess formed in said bottom housing element, thereby fastening said at least one of said interconnecting top housing elements to said bottom housing element and retaining said two-way transceiver element within said top and bottom housing elements.

15. A fixed magnetic contact wireless transceiver according to claim 14 and wherein a first one of said interconnecting top housing elements is configured for slidable fastening thereof onto said bottom housing element and for interconnecting with a second one of said interconnecting top housing elements via interconnecting latch elements integrally formed on each of said interconnecting top housing elements.

16. A fixed magnetic contact wireless transceiver according to claim 13 and wherein said bottom housing element comprises a battery housing element for housing a battery, and at least one snap-in element operable for retaining said battery within said battery housing.

17. A fixed magnetic contact wireless transceiver according to claim 16 and wherein said battery housing element comprises at least one battery engaging element and at least one battery circuit engaging element, and said two-way transceiver element comprises at least one transceiver circuit engaging element, said battery engaging element being operable for galvanically connecting a negative contact of said battery with said at least one battery circuit engaging element, said at least one battery circuit engaging element being operable for galvanic engagement with said at least one transceiver circuit engaging element of said two-way transceiver element upon enclosing said two-way transceiver element within said housing elements.

18. A fixed magnetic contact wireless transceiver according to claim 1 and wherein said fixed magnetic contact wireless transceiver component also comprises a tamper switch, wherein an attempt to tamper with said fixed magnetic contact wireless transceiver component results in toggling of said tamper switch.

19. A fixed magnetic contact wireless transceiver according to claim 16 and wherein said two-way transceiver element comprises a battery engaging element operable for engaging a positive contact of said battery.

20. A fixed magnetic contact wireless transceiver according to claim 1 and wherein said antenna is configured for high frequency communication with said alarm system, said high frequency being between 2405 and 2480 MHz.

21. A fixed magnetic contact wireless transceiver according to claim 1 and wherein said antenna ground reference plane opposite said antenna is operative to improve the gain of said antenna and to diminish interfering effects of materials disposed in a vicinity of said fixed magnetic contact wireless transceiver component.

22. A fixed magnetic contact wireless transceiver according to claim 1 and wherein said materials comprise metals, and said interfering effects comprise at least one of mistuning of said antenna, degradation of performance of said antenna and degradation of a range of said antenna.

23. A fixed magnetic contact wireless transceiver according to claim 1 and wherein said substrate of said antenna is formed of PCB.

24. A fixed magnetic contact wireless transceiver according to claim 1 and wherein said antenna ground reference plane is formed of stainless steel.

25. A fixed magnetic contact wireless transceiver according to claim 1 and wherein said gap is located less than 2 millimeters from a first end of said antenna, and has a width which is less than 2 millimeters.

26. A fixed magnetic contact wireless transceiver according to claim 1 and wherein said gap is located 1 millimeter from a first end of said antenna, and has a width of 1.3 millimeters.

27. A fixed magnetic contact wireless transceiver according to claim 26 and wherein said half via holes comprise:

a first half via hole formed in a second end of said antenna, opposite said first end of said antenna, said first half via hole being grounded;

a second half via hole formed in said first end of said antenna, said second half via hole being grounded; and a third half via hole formed in a side of said antenna, said third half via hole being operable as an input \ output port of said antenna.

28. A fixed magnetic contact wireless transceiver according to claim 1 and wherein a stray capacitance provided by said gap facilitates tuning of a frequency of said antenna.

* * * * *